(12) United States Patent
Ben-Itzhak (10) Patent No.: US 9,514,477 B2
(45) Date of Patent: Dec. 6, 2016

(54) SYSTEMS AND METHODS FOR PROVIDING USER-SPECIFIC CONTENT ON AN ELECTRONIC DEVICE

(71) Applicant: Yuval Ben-Itzhak, Brno (CZ)

(72) Inventor: Yuval Ben-Itzhak, Brno (CZ)

(73) Assignee: AVG Netherlands B.V., Amsterdam (NL)

( * ) Notice: Subject to any disclaimer, the term of this patent is extended or adjusted under 35 U.S.C. 154(b) by 175 days.

(21) Appl. No.: 13/938,829

(22) Filed: Jul. 10, 2013

(65) Prior Publication Data
US 2015/0020083 A1    Jan. 15, 2015

(51) Int. Cl.
| | | |
|---|---|---|
| G06F 3/00 | (2006.01) | |
| G06F 9/46 | (2006.01) | |
| G06F 13/00 | (2006.01) | |
| G06Q 30/02 | (2012.01) | |
| G06F 9/54 | (2006.01) | |
| H04N 21/443 | (2011.01) | |
| H04N 21/45 | (2011.01) | |
| H04N 21/81 | (2011.01) | |

(52) U.S. Cl.
CPC .......... *G06Q 30/0241* (2013.01); *G06F 9/543* (2013.01); *H04N 21/443* (2013.01); *H04N 21/4508* (2013.01); *H04N 21/818* (2013.01)

(58) Field of Classification Search
None
See application file for complete search history.

(56) References Cited

U.S. PATENT DOCUMENTS

| | | | |
|---|---|---|---|
| 4,527,250 A * | 7/1985 | Galdun et al. | 715/700 |
| 6,192,419 B1 * | 2/2001 | Aditham et al. | 719/315 |
| 2008/0052279 A1 | 2/2008 | Marolia et al. | |
| 2008/0313648 A1 | 12/2008 | Wang et al. | |
| 2009/0006543 A1 | 1/2009 | Smit | |
| 2011/0022643 A1 | 1/2011 | Jalon et al. | |
| 2012/0084792 A1 * | 4/2012 | Benedek et al. | 719/313 |
| 2012/0304283 A1 | 11/2012 | Beam et al. | |

OTHER PUBLICATIONS

International Search Report, Application No. PCT/US2014/44015, date of mailing Oct. 15, 2014.

* cited by examiner

*Primary Examiner* — Craig Dorais
(74) *Attorney, Agent, or Firm* — Kramer Levin Naftalis & Frankel LLP (57) ABSTRACT

Systems and methods for providing user-specific content on an electronic device are disclosed. The user-specific data can be generated in isolated applications that are prohibited from communicating directly with one another. Sharing of user data that enables these isolated applications to generate such user-specific data can be facilitated by the use of a master program that can be loaded along with each of the isolated applications on the electronic device.

19 Claims, 5 Drawing Sheets

SYSTEMS AND METHODS FOR PROVIDING USER-SPECIFIC CONTENT ON AN ELECTRONIC DEVICE

BACKGROUND OF THE DISCLOSURE

Mobile devices such as cellular telephones, smart phones, and tablets, use operating systems to manage hardware and provide common services for installed software applications. Unlike personal computer ("PC") operating systems in which applications can access and share resources with other applications, mobile operating systems typically isolate applications from each other for reasons of security and resource management. Isolating applications in this manner, however, limits the potential functionality of the mobile device. In particular, the ability to provide user-specific content in diverse applications, which can enhance the user experience, can be limited if those applications cannot share data with each other.

SUMMARY OF THE DISCLOSURE

Systems and methods for providing user-specific content on an electronic device are provided. The systems and methods can utilize a master software program with access to otherwise isolated applications in an electronic device to share user data between those isolated applications. The user data can then be used to present user-specific data in any or all of those applications. The user-specific content provided in the electronic device applications can include any suitable content, including, for example, pop-up or "toast" offers, targeted advertisements, suggested search terms, form/login/password filling data, and/or any other user-specific content that can improve the user's experience.

According to some embodiments, the master software program can be a keyboard program that has access to otherwise isolated applications. An operating system of the electronic device can load the keyboard application into any other application that requires user input. Accordingly, the keyboard program can also act as a liaison for gathering and sharing certain types of user data between the various applications installed on, our outside of, the electronic device. In addition to providing a conduit for the sharing of user data between isolated mobile data, the keyboard program may also analyze text input by the user and generate user-specific content based on the input text.

BRIEF DESCRIPTION OF THE DRAWINGS

The above and other aspects of the invention, its nature, and various features will become more apparent upon consideration of the following detailed description, taken in conjunction with the accompanying drawings, in which like reference characters refer to like parts throughout, and in which.

DETAILED DESCRIPTION OF THE DISCLOSURE

Figure 1:
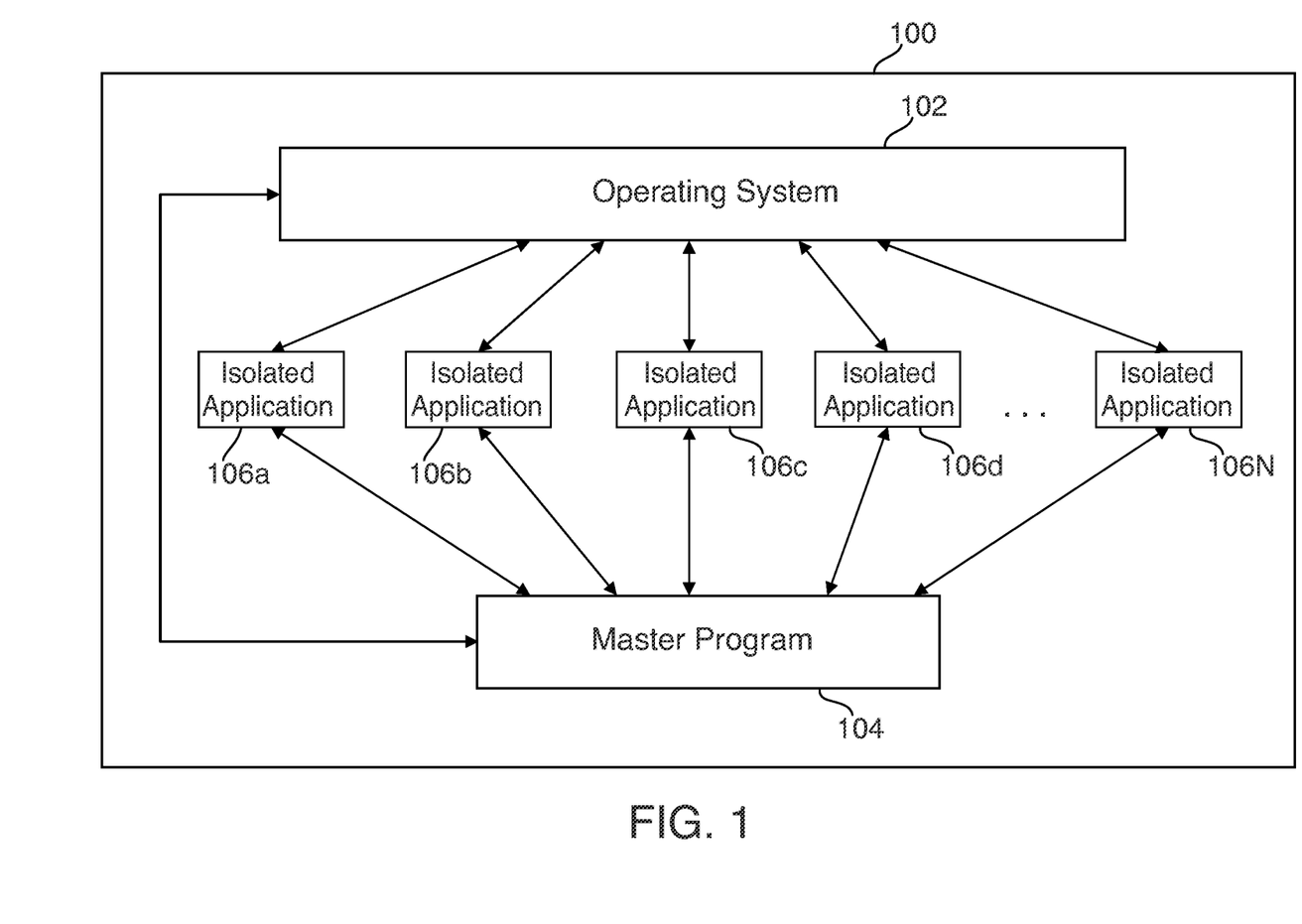
FIG. 1 shows an illustrative block diagram of an electronic device, in accordance with various embodiments.

FIG. 1 shows an illustrative block diagram of an electronic device 100, in accordance with some embodiments. Electronic device 100 can be any portable or non-portable device including, but not limited to, a communication device (e.g. mobile phone, smart phone), a multi-media device (e.g., MP3 player, TV, radio), a portable or handheld computer (e.g., tablet, netbook, laptop), a desktop computer, an All-In-One desktop, a peripheral device, any other system or device, or combinations of two or more of these types of devices. Electronic device 100 can generally include an operating system 102, a master program 104, and isolated applications 106a-N stored in memory (e.g., memory 904 described in more detail below with respect to FIG. 9).

Operating system 102 can include software and/or firmware designed to perform basic system operations such as running other applications on electronic device 100, performing basic hardware interface tasks (e.g., polling interface devices, recognizing keyboard input), managing a file system stored in memory, and/or allocating system resources (e.g., resources of a processor such as processor 902 of FIG. 9), for example. A nonvolatile memory which may be a portion of memory 904, for example, can persistently store operating system 102 such that it can be loaded each time electronic device 100 is booted up from a power-down state.

Operating system 102 can also define and/or implement rules for how other applications (e.g., isolated applications 106a-N on electronic device 100) may interact with one another. According to some embodiments, for instance, operating system 102 can prevent some or all of the various applications installed on electronic device 100 from sharing data directly and/or otherwise interacting with each other. Isolated applications 106a-N may be segregated in this manner and only permitted to communicate with operating system 102. Isolating applications in such a way may be beneficial for a number of reasons.

As one example, by preventing isolated applications 106a-N from communicating directly with one another, operating system 102 can improve the security of electronic device 100. That is, if isolated applications 106a-N are prevented from communicating, sharing data, and/or otherwise altering each other, the chance of a data breach can be minimized. Thus, a rogue application such as a virus, spyware, or malware, for example, would be unable to directly access sensitive user data stored in conjunction with another application and/or otherwise adversely alter other applications. Further, applications that are subject to attack due to security breaches are less likely to lead to other applications being exposed to subsidiary attacks.

As another example, operating system 102 may be able to better manage system resources such as memory allocation, battery life, and processor resources in environments where isolated applications 106a-N are prevented from communicating directly with one another. In such environments, isolated applications 106a-N can communicate directly with operating system 102 and, therefore, operating system 102 can more efficiently track and prioritize system resources among the various applications. Operating system 102 may also permit only one of isolated applications 106a-N to run at a time, thereby allowing all system resources to be dedicated to a single application and preventing wasteful use of resources by applications running in the background.

One downside of limiting communications between the various installed applications can be that sharing of data between applications that would enhance the user experience may be curtailed or completely prevented. That is, user data gathered in one isolated application may not be available to generate useful user-specific content in another application. In one particular example, a user's search history for music artists that the user enjoys, which might be logged by a browser application on electronic device 100, would not be shared with a separate music streaming application even though the data may be stored locally in memory on electronic device 100, and the music streaming application could potentially use that data (i) to help the user locate music by the artists he or she previously searched for and/or (ii) to suggest new artists to the user.

Another example of synergistic data sharing between applications that may be curtailed in environments where applications are isolated from each other is targeted advertising to the user of the electronic device. Providing advertisements in applications can help application developers monetize their products without resorting to direct monetization models such as charging users either one-time fees, or recurring subscription fees, for use of the applications, for example. As is well known, however, broadcast advertisements sent indiscriminately to an entire population are not as effective as targeted advertisements sent to a defined group of individuals who are more likely receptive to the advertisement content. It should be noted that this benefit is also reciprocal. Users may be more likely to continue using an application if the advertisements provided are for products and services they are more interested in.

Accordingly, electronic device 100 can include master program 104, which may be any software application installed on electronic device 100 that is not subject to application isolation rules set by operating system 102 that are applied to isolated applications 106a-n. Master program 104 may be controlled directly by operating system 102, and may, according to some embodiments, be considered part of operating system 102. Because master program 104 can be controlled directly by operating system 102, it may be considered more secure than third-party applications (e.g., isolated applications 106a-N) installed on electronic device 100 by a user. Operating system 102 may even load master program 104 into isolated applications 106a-N in order to promote useful bi-directional communications between isolated applications 106 and operating system 102.

According to some embodiments, master program 104 may be replaced with an alternative one. For example, operating system 102 can be provided with a default master program (e.g., a default keyboard application) that can be replaced with an alternative master program. Master program 104 may be replaced via a software update of operating system 102 and/or upon a user downloading a new master program (e.g., from the Internet). Operating system 102 may limit to one or more the number of master programs that can be installed on electronic device 100, according to various embodiments.

According to some embodiments, master program 104 can be a keyboard application designed to receive input from a user while the user is interacting with isolated applications 106a-N. Operating system 102 may load the keyboard application automatically along with each instance of an application on electronic device 100. In other embodiments, operating system 102 may instantiate master program 104 when an isolated application requires input from the user.

In general, master program 104 can be any application that can act as an intermediary between operating system 102 and isolated applications 106a-N. As an intermediary, master program 104 may, for example, engage in bidirectional communication with each of isolated applications 106a-N and operating system 102. This bidirectional communication can allow master program 104 to share data between isolated applications 106a-N in spite of these applications being prohibited from sharing such data with each other directly by operating system 102.

Isolated applications 106a-N can include any number of applications installed on electronic device 100 that are prohibited from interacting directly with each other by operating system 102. Examples of isolated applications 106a-N can include, but are not limited to, Internet browsers, e-mail clients, news applications, music applications, social networking applications, games, productivity applications, utilities (e.g., calendars, clocks, and calculators), shopping applications, navigation applications, weather applications, and travel applications.

Over time, each one of isolated applications 106a-N may collect user data as the user interacts with electronic device 100. An Internet browser, for example, can keep track of the user's web browsing history to determine what sort of things interests the user. While that browsing history may allow user-specific content (e.g., targeted advertisements or offers) to be presented to the user within that Internet browser, the browsing history data may not be available in other applications where the data may also be useful.

Figure 2:
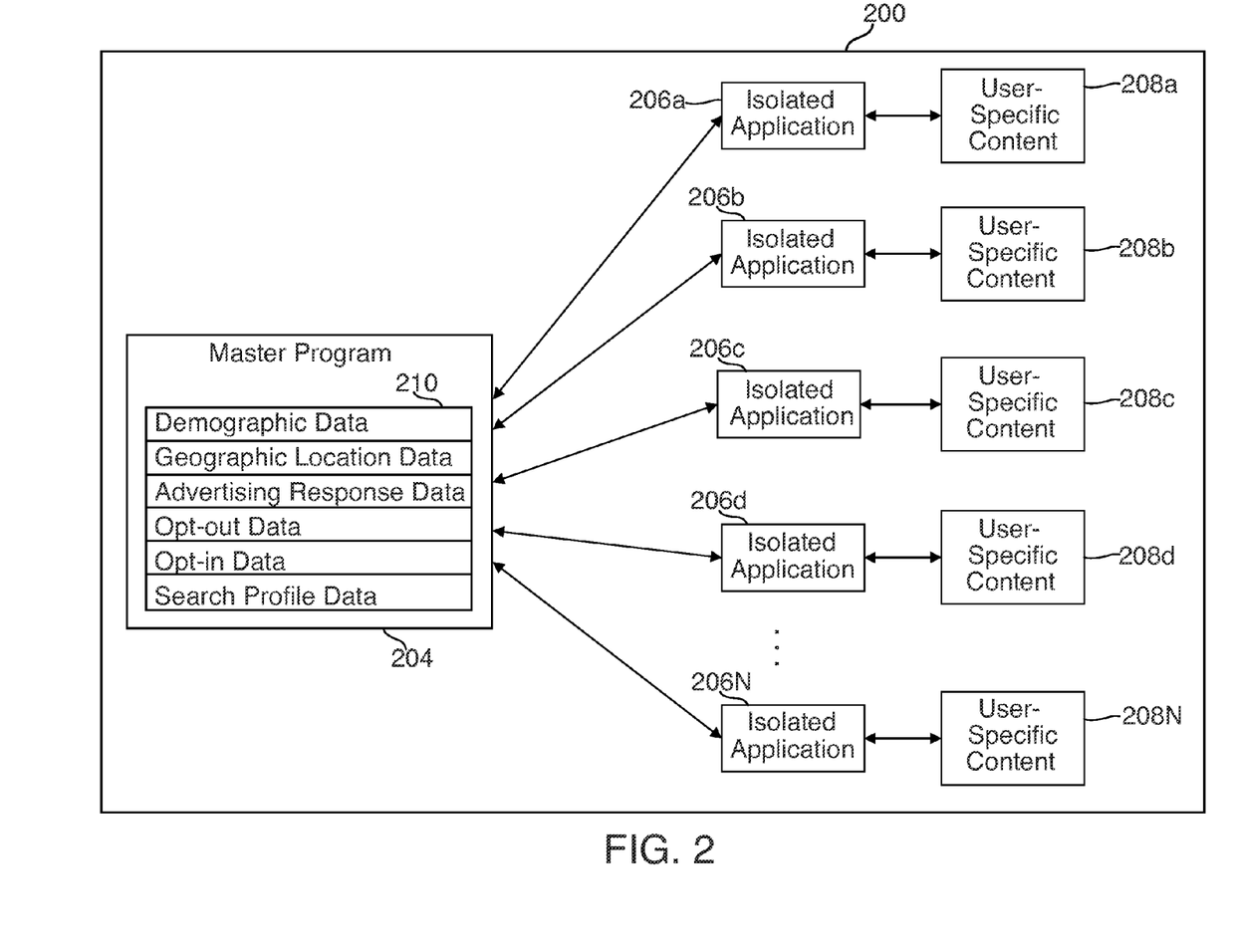
FIG. 2 shows an illustrative block diagram of another electronic device, in accordance with various embodiments.

FIG. 2 shows a block diagram of an electronic device 200, in accordance with some embodiments. Electronic device 200 can include master program 204 and isolated applications 206a-N, which may correspond to master program 104 and isolated applications 106a-N of FIG. 1, respectively. Master program 204 can be configured for bidirectional communication with isolated applications 206a-N. Accordingly, master program 204 may both send data to and receive data from isolated applications 206a-N.

Master program 204 can include a user profile 210 that can store any suitable user data about one or more users of electronic device 200. As depicted in FIG. 2, for example, user profile 210 can include demographic data (e.g., age and sex of the user), geographic location data (e.g., common geographic locations visited by the user), advertising response data (e.g., how the user responded to previously provided advertisements in one or more applications), opt-out data (e.g., whether the user has affirmatively requested that a particular entity, such as a clothing store, refrain from advertising to the user), opt-in data (e.g., whether the user has affirmatively requested that a particular entity advertise the user), and/or search profile data (e.g., a log of search terms searched by the user and/or Internet websites visited by the user).

Master program 204 can provide user profile 210 (or portions thereof) to any of isolated applications 206a-N when master program 204 is co-loaded with the application. According to some embodiments, an operating system (e.g., operating system 102 of FIG. 1) can load master program 204 each time one of isolated applications 106a-N is instantiated, and all or a portion of user profile 210 can be provided to the application at the same time or shortly thereafter.

In other embodiments, operating system 102 may only load master program 204 as required by one of isolated applications 206a-N, and user profile 210 may be provided to the application upon loading of master program 204. In these embodiments, isolated applications 206a-N can request that operating system 202 launch master application 204 when user input is required, for example. The application can provide master program 204 with a pointer (e.g., a callback function) that allows the application to receive data from master program 204. For instance, in embodiments in which master program 204 is a keyboard program, the operating system may load master program 204 upon request of an Internet browser application when the user attempts to interact with the browser (e.g., by entering a URL, utilizing a search engine, or providing data into a form).

Once user profile 210 is made available to one of isolated applications 206a-N, the application can utilize the data to provide respective user-specific content 208a-N within that application. According to some embodiments, each of isolated applications 206a-N may utilize user profile 210 differently. As suggested above, for example, a music streaming application may utilize a user's demographic data and search profile data to suggest new artists to the user and/or to help the user locate artists known to be of interest. Such a music streaming application may further utilize advertising response data, opt-out data, opt-in data, and search profile data to provide targeted advertisements to the user within the application. As one example, the user may chat with friends (e.g., via text messages or a social networking platform) about an artist. That information can be added to the user profile and later provided to a music streaming application in order to better populate an artist recommendation list or serve an advertisement that can be relevant to the user's interest.

Any one of isolated applications 206a-N may also be permitted to alter user profile 210. A browser application, for example, may provide updated search profile data to user profile 210 any time the browser is permitted to communicate with master program 204, such as when master program 204 is loaded into the browser application, for example. As another example, a music streaming application can determine the user's favorite artists, provide that information back to master program 204, and that information may be used by an events tickets application in conjunction with geographic location data stored in user profile 210 to suggest upcoming concerts or shows in the geographic area that the user may be interested in attending. As described above, isolated applications 206a-N can provide a pointer that allows the application to receive data from master program 204. Master program 204 can receive data from isolated applications 206a-N using a similar pointer and/or master program 204 can directly record data input into isolated applications 206a-N as the user utilizes master program 204.

According to some embodiments, user interactions with user-specific content 208a-N may be tracked by each respective isolated applications 206a-N and used to update user profile 210. Thus, if user-specific content 208a represents an advertisement provided in isolated application 206a, the application can determine whether the user acted positively or negatively with respect to the advertisement. Examples of positive reactions to user-specific content 208a may include a determination that the user followed a hyperlink associated with the advertisement or opted into future similar advertisements. On the other hand, examples of acting negatively with respect to user-specific content 208a may include ignoring the advertisement or opting out of future similar advertisements. In this way, user reactions to user-specific content 208a-N can be passed from isolated applications to master program 204, which can update user profile 210 accordingly.

Although user profile 210 is depicted in FIG. 2 as being part of master program 204, a person skilled in the art will appreciate that user profile 210 may associated with any other suitable software installed on electronic device 200 (an operating system or one of isolated applications 206a-N), or user profile 210 may be a data structure stored in a file system of electronic device 200 that is not primarily associated with any software extant on electronic device 200. According to some embodiments, user profile 210 may also be stored outside of electronic device 200 (e.g., on a cloud-based server accessible using electronic device 200).

In still further embodiments, user-specific content 208a-N can represent password management and/or form filling data for use within a respective one of isolated applications 206a-N. For instance, user profile 210 can store credentials to log in to any or all of isolated applications 206a-N. When the user opens an application, master program 204 can recognize the application and enter the proper credentials from user profile 210 into the fields for the user's login name and password. Additionally or alternatively, master program 204 can suggest the most relevant login names and passwords for a given isolated application. Similarly, when an application presents the user with a billing form, master program 204 can recognize the form and enter the user's billing information (e.g., billing address, shipping address, credit card information, etc.) into the appropriate fields on the billing form. In some embodiments, such form-filling information may be provided automatically to an application, while in other embodiments, the user may be given an asked whether the form should be filled in using data stored in user profile 210. According to some embodiments, such data can be imported from an external source (e.g., a PC program or a remote database) and/or provided by the user in isolated applications 206a-N or master program 204.

It should also be noted that user profile 210 may be updated manually by a user of electronic device 200 in addition to being updated as a result of interactions with isolated applications 206a-N. Thus, the user may be permitted to manually fill in some fields of user profile 210 (e.g., demographic data) without waiting for user profile 210 to be learn the requisite information based on data received from user interactions with isolated applications 206a-N.

Figure 3:
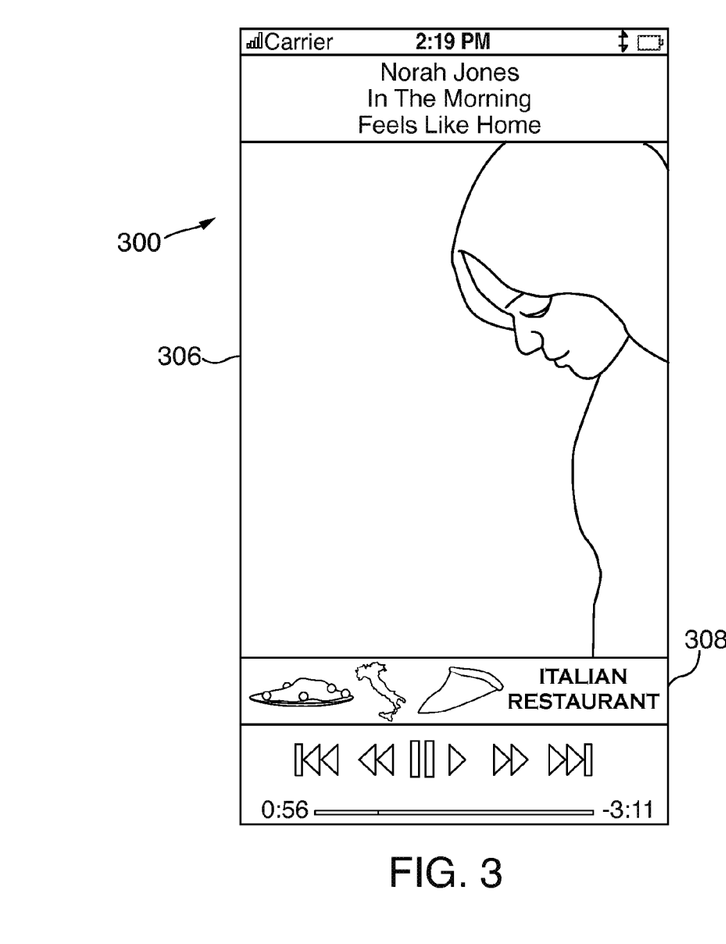
FIGS. 3-6 show illustrative screenshots of isolated applications displaying user-specific content, in accordance with some embodiments.

FIG. 3 shows an illustrative screenshot 300 of an isolated application 306 displaying user-specific content 308, in accordance with some embodiments. In particular, isolated application 306 can be a music streaming application running on an electronic device (e.g., isolated application 106a of electronic device 100 of FIG. 1). In addition to the graphical elements of the music streaming application (i.e., the artist, the song name, album name, the album art, and the music controls), screenshot 300 can include user-specific content 308.

User-specific content 308 depicted in screenshot 300 can be a targeted advertisement for an Italian restaurant. As described above, user-specific content 308 can be determined based upon any suitable data found in a user profile (e.g., user profile 210 of FIG. 2). Thus, the advertisement for the Italian restaurant displayed in screenshot 300 may have been chosen based on one or more of the following factors that can be gleaned from a user profile: proximity of the restaurant's location to a geographical location often frequented by the user; information that the user recently and/or often searches the web for Italian restaurants; information that the user has opted-into advertisements from that particular Italian restaurant; information that the user has previously followed a hyperlink for that Italian restaurant or a similar Italian restaurant; or any other suitable information stored in the user profile.

If user-specific content 308 is configured to accept user action (e.g., via following a hyperlink associated with the content), the user's decision to act positively or negatively with respect to user-specific content 308 can be noted and provided to a master program (e.g., master program 204 of FIG. 2) in order to update the user profile based on the action taken (or not taken). According to some embodiments, the user may be given an option to opt-in to or opt-out of future advertisements from the advertiser.

Figure 4:
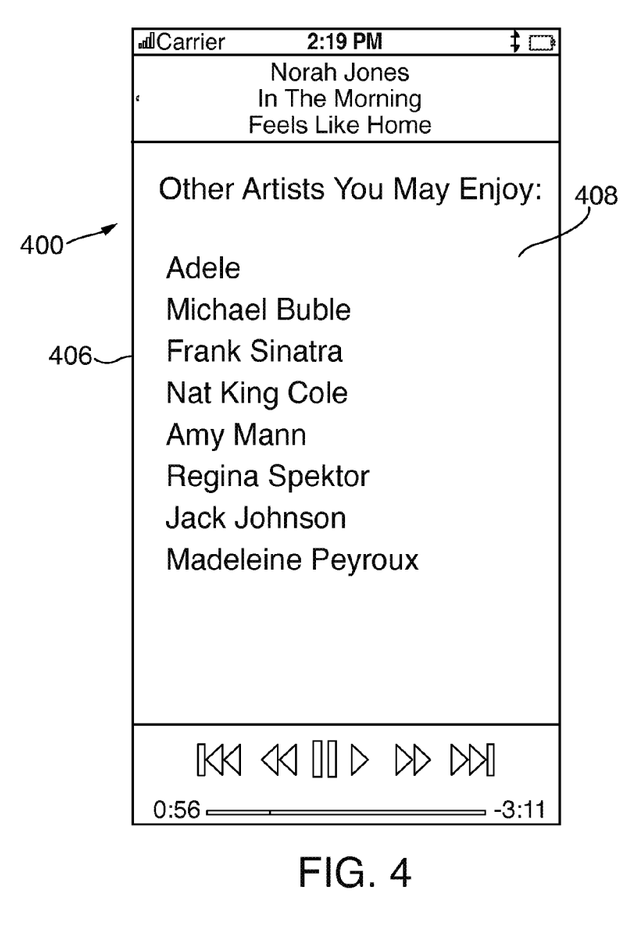

FIG. 4 shows an illustrative screenshot 400 of an isolated application 406 displaying user-specific content 408, in accordance with some embodiments. Screenshot 400 may be another screenshot of the same music streaming application displayed in screenshot 300 of FIG. 3, except that the user-specific content 408 displayed may be different.

In particular, user-specific content 408 can be a list of musical artists that the user may enjoy based on data gleaned from a user profile (e.g., user profile 210 of FIG. 2). It may be, for example, that the user recently searched the Internet for a particular artist in a browser application on the electronic device, and that search history was incorporated into the user's user profile. The master program, invoked when the user opened isolated application 406 can have made the user profile available to isolated application 406, and the application could have used the user profile to generate and display a list of artists the user is likely to enjoy as user-specific content 408.

It should be appreciated that similar synergies between isolated applications on an electronic device can be exploited by using a master program to share, exchange, and learn user data between the applications. Targeted advertisements that make use of user data stored in a user profile and made available by a master program, for example, can be displayed in any application on the electronic device. The types of user-specific content explicitly mentioned above are merely exemplary, therefore, and should not be understood as limiting the scope of the invention.

Figure 5:
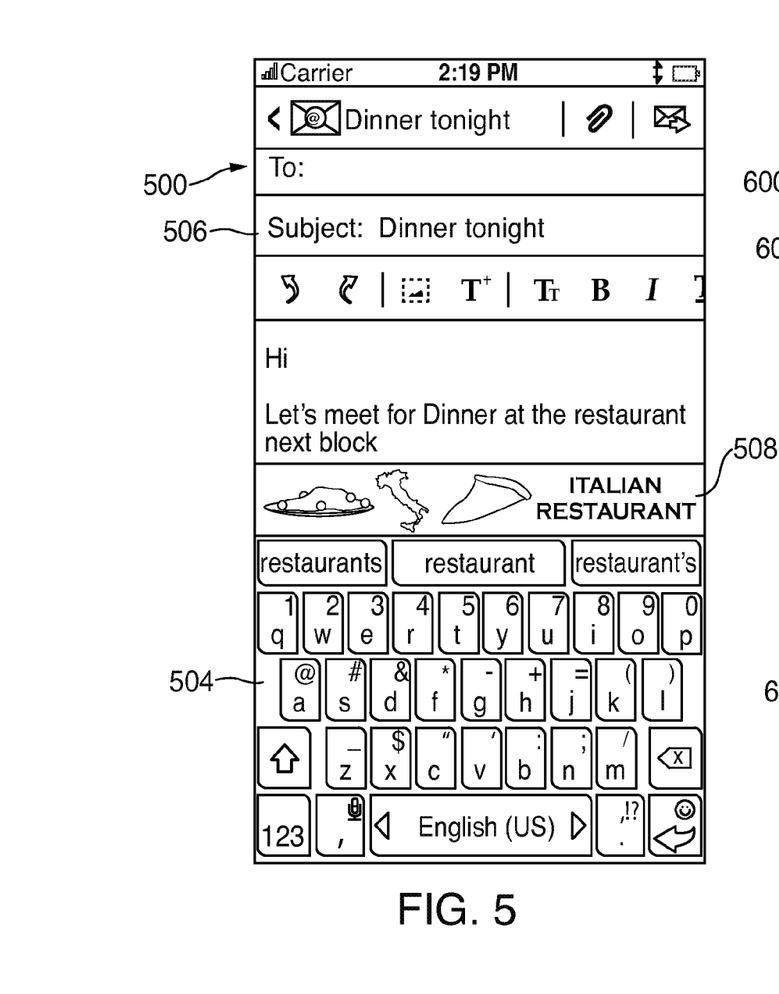

Attention is now directed to FIG. 5, which shows a screenshot 500 of an isolated application 506 displaying user-specific content 508, in accordance with some embodiments. In particular, isolated application 506 can be an e-mail application installed on an electronic device (e.g., electronic device 100 of FIG. 1). Further, screenshot 500 includes an exemplary graphical user interface for a master program 504, which, as depicted in FIG. 5, is a virtual keyboard for a keyboard application that can be displayed on a touchscreen surface of the electronic device. It should be understood that although a virtual keyboard is displayed in FIG. 5, master program 504 can also accept input from any other suitable I/O device including a mechanical keyboard, which can be integrally formed with the electronic device or otherwise communicatively coupled to the electronic device, a mouse, a gesture recognition sensor or module, or a voice recognition device.

In order to interact with isolated application 506, a user of the electronic device can use the virtual keyboard of master program 504 for the purpose of entering text into one or more of the text fields displayed in screenshot 500 (i.e., the To: field, the Subject: field, and the e-mail body field). As the user enters text using the virtual keyboard, master program 504 and/or isolated application 506 can analyze the typed text and supply user-specific content 508 based on the results on the analysis. Accordingly, because the user typed in the word "restaurant" into the text of an e-mail in isolated application 506, the application can display user-specific content 508 to the user, which represents an advertisement for an Italian restaurant.

Additionally, isolated application 506 can chose to display user-specific content 508 based upon at least one other variable. The variable may be the model number, IP address, or current location of the electronic device, for example. Further, the variable may be any suitable information gleaned from a user profile (e.g., user profile 210 of FIG. 2).

In such embodiments, as the user enters text into isolated application 506 using the virtual keyboard of master program 504, isolated application 506 can parse the text and one or more other variables and display user-specific content 508 to the user. The targeted advertisement shown in screenshot 500, therefore, may have been chosen by isolated application 506 because: 1) the user typed the word "restaurant" into a text field of isolated application 506; 2) the current location of the electronic device (e.g., as determined by a GPS module) was close to the advertised restaurant; and/or 3) the user profile made available by master program 504 indicated that the user enjoys Italian food. While an advertisement for an Italian restaurant was displayed as user-specific content 508, if the user profile indicated that the user enjoyed Indian food, an Indian food restaurant may have been displayed instead.

Figure 6:
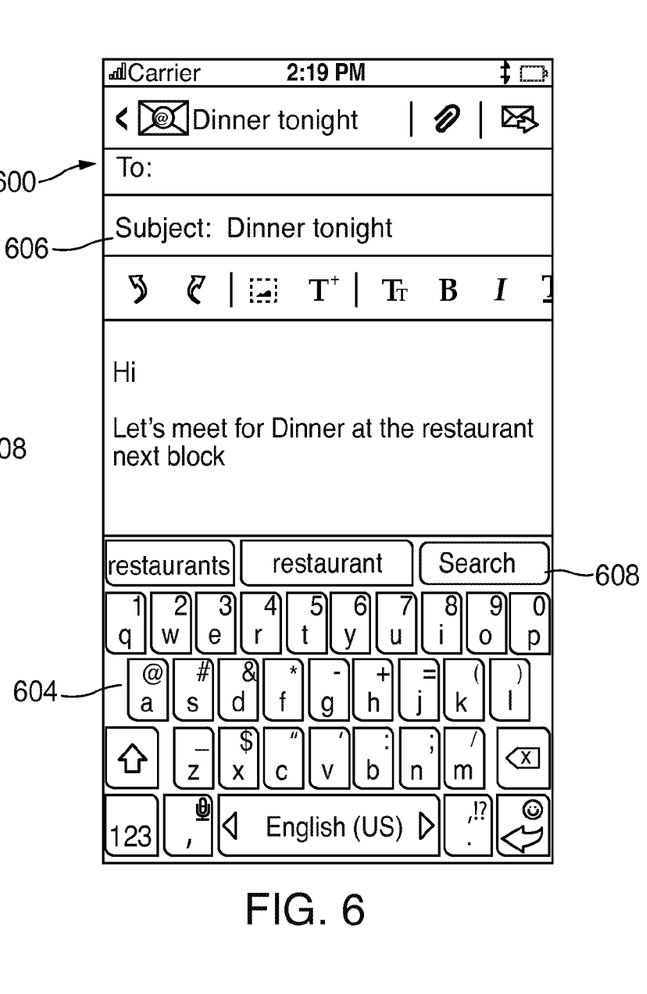

FIG. 6 shows a screenshot 600 of an isolated application 606 providing context-specific search functionality, in accordance with some embodiments. Like isolated application 506 discussed above with respect to FIG. 5, isolated application 606 can be an e-mail application that can analyze text a user enters using a virtual keyboard associated with master program 604.

Based on the analysis of the text entered by the user, isolated application 606 (or master program 604) can generate and display potential search terms as user-specific content 608. The user can then choose one of the generated search terms and invoke a search in, for example, an isolated Internet browser application, by invoking the "Search" button. Master program 604 can then unilaterally, or with assistance from an operating system (e.g., operating system 102 of FIG. 1), open the Internet browser and commence a search using the chosen search term.

According to some embodiments, the Internet browser application, or any other isolated application instantiated to run the search, can access a user profile (e.g., user profile 210 of FIG. 1) via master program 604, which can be loaded along with the application opened to run the search. Accordingly, the search results can be based not only on the search term generated by the analyzed text entered into isolated application 606, but also on one or more additional variables gleaned from a user profile made available via master program 604.

Figure 7:
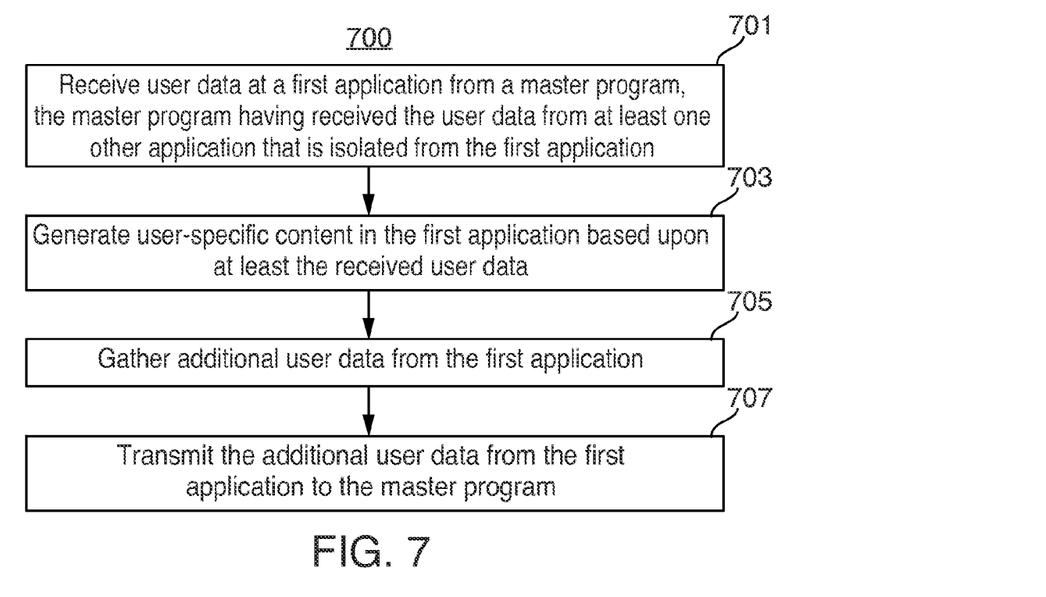
FIGS. 7 and 8 show illustrative flowcharts of processes for displaying user-specific content, in accordance with some embodiments.

FIG. 7 shows a flowchart of an illustrative process 700 for providing user-specific content on an electronic device, in accordance with some embodiments. Process 700 can begin at step 701, which can include receiving user data at a first application (e.g., isolated application 106a of FIG. 1) stored in a memory of an electronic device (e.g., electronic device 100 of FIG. 1) from a master program (e.g., master program 104 of FIG. 1) also stored in a memory of an electronic device, wherein the master program received the user data from at least one other application (e.g., isolated application 106b) that is isolated from the first application. The user data can be any suitable data about the user that can allow the first application to provide user-specific content to the user, as described in more detail below. In some embodiments, the user data may be stored in a user profile data structure (e.g., user profile 210 of FIG. 1) that can be associated with the master program, an operating system of the electronic device, an application of the electronic device (e.g., one of isolated applications 106a-N of FIG. 1), or that is otherwise accessible to the master program.

At step 703, the first application can generate user-specific content (e.g., user-specific content 208a of FIG. 2) based on at least the received user data. The user-specific content can be any suitable content generated by the first application such as one or more targeted advertisements and/or enhanced application functionality (e.g., artist suggestions in a music streaming application, search term suggestions in an Internet browser application, or vacation suggestions in a travel application). The user-specific content can be displayed or otherwise made available to the user on a display of the electronic device (e.g., display assembly 912 described below) via the first application.

At step 705, the master program can gather additional user data from the first application. The additional user data may be any data that can be added to a user profile suitable for generating user-specific content in the first application or any other isolated application on the electronic device. Accordingly, the additional user data may represent, for example, demographic data, geographic location data, advertising response data, opt-out data, opt-in data, search profile data, and/or any other suitable data.

At step 707, the first application can transmit the additional data from the first application to the master program. The master program can then add the additional data to the user profile, and the updated user profile can be made available to one or more other isolated applications on the electronic device in order to allow those applications to provide user-specific content to the user.

Figure 8:
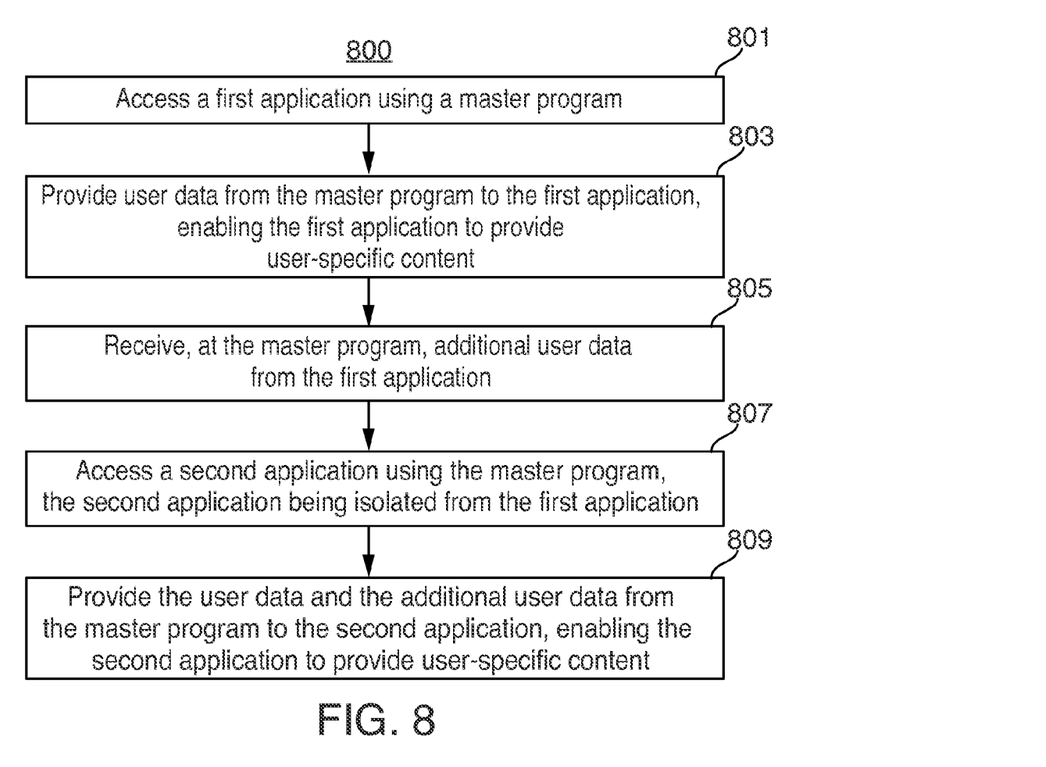

FIG. 8 shows a flowchart of an illustrative process 800 for providing user-specific content on an electronic device, in accordance with some embodiments. Process 800 can begin at step 801, which can include accessing a first application (e.g., isolated application 106a of FIG. 1) using a master program (e.g., master program 104 of FIG. 1). The first application can be any suitable application installed in a memory on the electronic device that is prohibited from sharing data directly with other applications installed in that memory or another suitable memory. The master program can be any application that can be instantiated along with the first application that is not subject to application isolation rules set by an operating system of the electronic device. According to some embodiments, the master program can be a keyboard application for facilitating user interaction with the first application.

At step 803, the master program can provide user data to the first application, thereby enabling the first application to provide user-specific content to a user via a display (e.g., a display of display assembly 912 of FIG. 9). As described above, the user data may be any suitable data that can be used by the first application to generate user-specific content, and it may be stored in a user profile (e.g., user profile 210 of FIG. 2) associated with or otherwise accessible by the master program.

At step 805, the master program can receive additional user data from the first application. The additional user data can include any data that can be added to a user profile suitable for generating user-specific content in the first application or any other isolated application on the electronic device. Accordingly, the user data can be, for example, demographic data, geographic location data, advertising response data, opt-out data, opt-in data, search profile data, or any other suitable user data that can be used to generate user-specific content.

At step 807, the master program can access a second application that is isolated from the first application. That is, the second application may be prohibited from directly communicating with, sharing data with, and/or altering the first application. The first and second applications may be isolated per rules defined by an operating system (e.g., operating system 102 of FIG. 1), for example.

At step 809, the master program can provide the user data and the additional user data to the second application, enabling the second application to provide user-specific content to the user. The user-specific content can be any suitable content that may be generated from the user data and/or the additional user data received at the second application. For example, the user-specific content may include one or more targeted advertisements, form-filling data, login/password data, application enrichment data, and/or any other suitable user-specific content.

It is to be understood that the steps shown in processes 700 and 800 are merely illustrative and that existing steps may be modified or omitted, additional steps may be added, and the order of certain steps may be altered.

Moreover, the methods described with respect to FIGS. 7 and 8, as well as any other aspects of the invention, may each be implemented by software, but may also be implemented in hardware, firmware, or any combination of software, hardware, and firmware. They each may also be embodied as machine-readable code recorded on a machine-readable medium. The machine-readable medium may be any data storage device that can store data that can thereafter be read by a computer system. Examples of the machine-readable medium may include, but are not limited to, read-only memory, random-access memory, flash memory, CD-ROMs, DVDs, magnetic tape, and optical data storage devices. The machine-readable medium can also be distributed over network-coupled computer systems so that the machine-readable code is stored and executed in distributed fashion.

FIG. 9 shows a schematic view of an illustrative electronic device 900, in accordance with some embodiments. Electronic device 900 may be any electronic device configured to embody and/or implement the systems and methods described herein (e.g., electronic device 100 of FIG. 1). Electronic device 900 can be, but is not limited to, a music player, video player, still image player, game player, other media player, music recorder, movie or video camera or recorder, still camera, other media recorder, radio, medical equipment, domestic appliance, transportation vehicle instrument, musical instrument, calculator, cellular telephone, other wireless communication device, personal digital assistant, remote control, pager, computer (e.g., desktop, laptop, tablet, server, etc.), monitor, television, stereo equipment, set up box, set-top box, boom box, modem, router, keyboard, mouse, speaker, printer, and combinations thereof. In some embodiments, electronic device 900 may perform a single function (e.g., a device dedicated to displaying image content) and, in other embodiments, electronic device 900 may perform multiple functions (e.g., a device that displays image content, plays music, and receives and transmits telephone calls).

Electronic device 900 may include a housing 901, a processor or control circuitry 902, memory 904, communications circuitry 906, power supply 908, input component 910, and display assembly 912. Electronic device 900 may also include a bus 903 that may provide a data transfer path for transferring data and/or power, to, from, or between various other components of electronic device 900. In some embodiments, one or more components of electronic device 900 may be combined or omitted. Moreover, electronic device 900 may include other components not combined or included in FIG. 9. For the sake of simplicity, only one of each of the components is shown in FIG. 9.

Memory 904 may include one or more storage mediums, including for example, a hard-drive, flash memory, permanent memory such as read-only memory ("ROM"), semipermanent memory such as random access memory ("RAM"), any other suitable type of storage component, or any combination thereof. Memory 904 may include cache memory, which may be one or more different types of memory used for temporarily storing data for electronic device applications. Memory 904 may store media data (e.g., music, image, and video files), software (e.g., operating system 102, master program 104, and/or isolated applications 106*a*-N of FIG. 1), firmware, user data (e.g., user data in user profile 210 of FIG. 2), transaction information (e.g., information such as credit card information), wireless connection information (e.g., information that may enable electronic device 900 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications circuitry 906 may be provided to allow electronic device 900 to communicate with one or more other electronic devices or servers using any suitable communications protocol. For example, communications circuitry 906 may support Wi-Fi™ (e.g., an 802.11 protocol), Ethernet, Bluetooth™, high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), Bit-Torrent™, file transfer protocol ("FTP"), real-time transport protocol ("RTP"), real-time streaming protocol ("RTSP"), secure shell protocol ("SSH"), any other communications protocol, or any combination thereof. Communications circuitry 906 may also include circuitry that can enable electronic device 900 to be electrically coupled to another device (e.g., a computer or an accessory device) and communicate with that other device, either wirelessly or via a wired connection.

Power supply 908 may provide power to one or more of the components of electronic device 900. In some embodiments, power supply 908 can be coupled to a power grid (e.g., when electronic device 900 is not a portable device, such as a desktop computer). In some embodiments, power supply 908 can include one or more batteries for providing power (e.g., when electronic device 900 is a portable device, such as a cellular telephone). As another example, power supply 908 can be configured to generate power from a natural source (e.g., solar power using one or more solar cells).

One or more input components 910 may be provided to permit a user to interact or interface with electronic device 900. For example, input component 910 can take a variety of forms, including, but not limited to, a track pad, dial, touch screen, one or more buttons (e.g., a keyboard), mouse, joy stick, track ball, and combinations thereof. For example, input component 910 may include a multi-touch screen. Each input component 910 can be configured to provide one or more dedicated control functions for making selections or issuing commands associated with operating electronic device 900.

Electronic device 900 may also include one or more output components that may present information (e.g., textual, graphical, audible, and/or tactile information) to a user of electronic device 900. An output component of electronic device 900 may take various forms, including, but not limited to, audio speakers, headphones, audio line-outs, visual displays, antennas, infrared ports, or combinations thereof.

For example, electronic device 900 may include display assembly 912 as an output component. Display assembly 912 may include any suitable type of display or interface for presenting visible information to a user of electronic device 900. In some embodiments, display assembly 912 may include a display embedded in electronic device 900 or coupled to electronic device 900 (e.g., a removable display). Display assembly 912 may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, display assembly 912 can include a movable display or a projecting system for providing a display of content on a surface remote from electronic device 900, such as, for example, a video projector, a head-up display, or a three-dimensional (e.g., holographic) display. As another example, display assembly 912 may include a digital or mechanical viewfinder. In some embodiments, display assembly 912 may include a viewfinder of the type found in compact digital cameras, reflex cameras, or any other suitable still or video camera.

It should be noted that one or more input components and one or more output components may sometimes be referred to collectively as an I/O interface (e.g., input component 910 and display assembly 912 as I/O interface 911). It should also be noted that input component 910 and display assembly 912 may sometimes be a single I/O component, such as a touch screen that may receive input information through a user's touch of a display screen and that may also provide visual information to a user via that same display screen.

Processor 902 of electronic device 900 may control the operation of many functions and other circuitry provided by electronic device 900. For example, processor 902 may receive input signals from input component 910 and/or drive output signals to display assembly 912. Processor 902 may load a user interface program (e.g., a program stored in memory 904 or another device or server) to determine how instructions or data received via an input component 910 may manipulate the way in which information is provided to the user via an output component (e.g., display assembly 912). For example, processor 902 may control the viewing angle of the visible information presented to the user by display assembly 912 or may otherwise instruct display assembly 912 to alter the viewing angle.

Electronic device 900 may also be provided with a housing 901 that may at least partially enclose one or more of the components of electronic device 900 for protecting them from debris and other degrading forces external to electronic device 900. In some embodiments, one or more of the components may be provided within its own housing (e.g., input component 910 may be an independent keyboard or mouse within its own housing that may wirelessly or through a wire communicate with processor 902, which may be provided within its own housing).

While there have been described systems and methods for providing user-specific content on an electronic device, it is to be understood that many changes may be made therein without departing from the spirit and scope of the invention. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The described embodiments of the invention are presented for the purpose of illustration and not of limitation.

What is claimed is:

1. A method for providing user-specific content on an electronic device, the electronic device comprising a display and a memory, the memory comprising an operating system, a keyboard application, and a plurality of isolated applications installed therein, the plurality of isolated applications being restricted, by the operating system, from communicating directly with one another to avoid rogue software affecting one of the isolated applications from compromising others of the isolated applications, the method comprising:

gathering, using the keyboard application, user data during user interaction with a first application of the plurality of isolated applications; and notwithstanding restriction, by the operating system, of direct communication between the first application and other applications of the plurality of isolated applications, utilizing the keyboard application to provide at least a portion of the user data to at least a second application of the plurality of isolated applications during execution of the at least a second application so as to effect synergistic data sharing between applications that are otherwise communicatively isolated from one another, the at least a portion of the user data enabling the at least a second application to suggest user-specific content of potential interest to a user via the display.

2. The method of claim 1, further comprising:
gathering additional user data from the at least a second application via the keyboard application; and
providing at least a portion of each of the user data and the additional user data from the keyboard application to a third application of the plurality of isolated applications, the user data and the additional user data enabling the third application to suggest additional user-specific content of potential interest to the user via the display.

3. The method of claim 2, further comprising:
loading the keyboard application into the third application.

4. The method of claim 1, further comprising:
loading the keyboard application into the first application.

5. The method of claim 1, wherein the at least a portion of the user data comprises web browsing history data.

6. The method of claim 1, wherein gathering the user data comprises:
analyzing text input using the keyboard application; and
adding the user data to a user profile stored in the memory.

7. The method of claim 6, wherein providing the at least a portion of the user data comprises providing the at least a second application access to the user profile, the method further comprising at least one of:
generating user-specific content in the at least a second application based at least in part on the user profile; and
generating search terms in the at least a second application based at least in part on the user profile.

8. The method of claim 1, wherein the user data comprises at least one of:
demographic data;
geographic location data;
advertising response data;
opt-out data;
opt-in data;
and search profile data.

9. The method of claim 1, further comprising:
gathering, at the keyboard application, additional user data from an external source.

10. A method for providing user-specific content on an electronic device, the electronic device including a memory, a keyboard program, and a plurality of applications installed in the memory, the electronic device executing an operating system operative to restrict the plurality of applications from communicating directly with one another to avoid rogue software affecting one of the plurality of applications from compromising others of the plurality of applications, the method comprising:

loading the keyboard program into a first application of the plurality of applications;

notwithstanding restriction, by the operating system, of direct communication between the first application and other applications of the plurality of applications, receiving, at the first application from the loaded keyboard program, at least a portion of user data collected by the keyboard program during user interaction with at least one other application of the plurality of applications, so as to effect synergistic data sharing between applications that are otherwise communicatively isolated from one another; and generating, using the first application, user-specific content of potential interest to a user based at least in part on the user data.

11. The method of claim 10, further comprising:
gathering additional user data from the first application using the keyboard program; and
transmitting the additional user data from the keyboard program to another application.

12. The method of claim 11, wherein the additional user data comprises at least one of:
demographic data;
geographic location data;
advertising response data;
opt-out data;
opt-in data;
and search profile data.

13. The method of claim 10, wherein the user-specific content comprises targeted advertising.

14. The method of claim 10, further comprising:
displaying the user-specific content via a display of the electronic device.

15. The method of claim 10, wherein the user-specific content comprises information regarding at least one music artist.

16. The method of claim 10, wherein the user-specific content comprises Internet search terms.

17. The method of claim 10, wherein the first application is an Internet browser, and wherein the user-specific content comprises search results based at least in part on at least one search term input to the electronic device.

18. An electronic device, comprising:
a plurality of applications installed in a memory on the electronic device;
an operating system installed in the memory, comprising a set of instructions prohibiting the plurality of applications from communicating directly with one another to avoid rogue software affecting one of the plurality of applications from compromising others of the plurality of applications;
a keyboard program installed in the memory that is not subject to the set of instructions that prohibits the plurality of applications from communicating with each other; and a user profile stored in the memory that is accessible by the keyboard program, the user profile comprising user data including data regarding a user's behavior identified from the user's interaction with at least a first application of the plurality of applications, wherein the keyboard program is configured to:

notwithstanding the set of instructions prohibiting the plurality of applications from communicating directly with one another, provide the user data to at least a second application of the plurality of applications so as to enable the at least a second application to generate user-specific content based at least on the user data and to effect synergistic data sharing between applications that are otherwise communicatively isolated from one another;

receive additional user data from the at least a second application of the plurality of applications; and update the user profile with the additional user data.

19. The electronic device of claim 18, wherein the user-specific content comprises a targeted advertisement.

* * * * *